Patented Sept. 18, 1951

2,568,636

UNITED STATES PATENT OFFICE 2,568,636

PROCESS FOR PREPARING ANHYDROUS ALPHA - BETA UNSATURATED CARBOXYLIC ACIDS

Archie B. Japs, Cuyahoga Falls, Ohio, assignor to The B. F. Goodrich Company, New York, N. Y., a corporation of New York No Drawing. Application July 29, 1950, Serial No. 176,778

7 Claims. (Cl. 260—526)

This invention relates to an improved process for preparing anhydrous alpha-beta unsaturated carboxylic acids and pertains more particularly to the preparation of such acids by pyrolyzing beta-lactone polymers in the presence of a triaryl phosphate.

It is disclosed in U. S. Patent 2,356,459 to Frederick E. Küng that a wide variety of beta-lactones are readily prepared by reacting ketenes with a carbonyl containing compound such as an aldehyde or ketone. It is further disclosed in U. S. Patent 2,361,036, to Küng, that polymers of beta-lactones may be pyrolyzed at temperatures of about 150° C. to 300° C. to give alpha-beta unsaturated carboxylic acids.

It has been found, however, that when this latter process is employed, a considerable quantity of the alpha-beta unsaturated carboxylic acid polymerizes spontaneously, either in the reactor wherein the pyrolytic decomposition is carried out, or during subsequent recovery procedures, even though reduced pressures are utilized throughout the entire process. As a result, the yields of the alpha-beta unsaturated carboxylic acid are greatly reduced and serious operational difficulties are encountered due to the excessive polymer formation in the reactor and in the recovery apparatus; consequently the process is not well suited for use on an industrial scale.

Accordingly, it is an object of the present invention to provide a process for the preparation of alpha-beta unsaturated carboxylic acids by the pyrolysis of beta-lactone polymers wherein the polymerization of the unsaturated acid during the pyrolysis process is reduced to a minimum. A second object is to provide a process for the preparation of anhydrous alpha-beta unsaturated carboxylic acids, particularly anhydrous acrylic acid, by the pyrolysis of beta-lactone polymers. Other objects will be apparent hereinafter.

I have now discovered that the above and other objects are readily accomplished by pyrolyzing the beta-lactone polymer in contact with a triaryl phosphate such as tricresyl or triphenyl phosphate which is maintained at the desired pyrolysis temperature. In this manner polymer formation is almost negligible and extremely high yields of anhydrous alpha-beta unsaturated carboxylic acids are secured.

The beta-lactone polymers which may be employed in the process of this invention are defined as polymers of beta-lactones of monocarboxylic acids having at least one unsubstituted hydrogen atom on the alpha-carbon atom and containing only unreactive hydrocarbon substituents. Structurally, these beta-lactones possess the formula

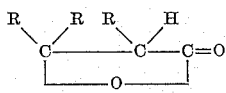

wherein R is hydrogen or an unreactive hydrocarbon radical such as alkyl, aryl, aralkyl, or a cycloalkyl radical. Included in this class of compounds are the beta-lactones of saturated aliphatic monocarboxylic acids containing at least one hydrogen atom on the alpha carbon atom such as beta-propiolactone, beta-butyrolactone, alpha - methyl-beta-propiolactone, beta-valerolactone, alpha - methyl - butyrolactone, alpha-ethyl-beta-propiolactone, beta-isovalerolactone, beta-n-caprolactone, alpha-methyl-beta-valerolactone, beta - methyl - beta-ethyl-beta-propiolactone, alpha - methyl-beta-ethyl-beta-propiolactone, alpha-methyl-beta-methyl-beta-propiolactone, alpha-propyl-beta-propiolactone, alphabutyl - beta - propiolactone, beta-methyl-beta-propyl-beta-propiolactone, and the like; the beta-lactones of aryl-substituted carboxylic acids such as beta - phenyl - beta - propiolactone, alphaphenyl-beta-propiolactone, and other beta-lactones of substituted carboxylic acids such as beta-cyclohexyl-beta-propiolactone, beta-benzyl-betapropiolactone, alpha-cyclohexyl-beta-propiolactone and the like. The preferred compounds are the beta-lactones containing less than 6 carbon atoms, particularly the low molecular weight aliphatic beta-lactones, since the difficulty of carrying out the reaction is increased when employing lactones of higher molecular weight.

The polymers of beta-lactones which are pyrolyzed to alpha-beta unsaturated carboxylic acids in accordance with this invention may be prepared in a variety of ways depending upon the particular lactone employed and the relative ease with which it is polymerized. For example, low molecular weight aliphatic beta-lactones which contain at least one hydrogen in the alpha position are polymerized readily simply by the application of heat, pressure, or actinic light or by the action of a number of substances which are termed catalysts. In fact these lactones polymerize so easily that one of the difficulties experienced in their preparation is to isolate the lactone under conditions which avoid polymerization. The most convenient method of polymerizing the lactone is to heat the lactone or a solution of the lactone in a suitable solvent in the presence of a catalyst. Effective catalysts are, in general, substances which promote condensation reactions including alkaline materials such as potassium carbonate, sodium carbonate, potassium acetate, sodium hydroxide, sodium cyanide, ammonia, pyridine, quinoline, trimethyl amine, triethanol amine, dimethyl aniline and the like; Friedel-Crafts type condensation catalysts such as zinc chloride, aluminum chloride, boron fluoride, iron chloride, stannic chloride or complexes of these compounds with organic compounds such as ethyl ether, ethyl chloride, isopropyl chloride and the like; and other acidic condensation catalysts such as hydrogen chloride and the like. Although some polymerization takes place at ordinary room temperature or at even lower temperatures, particularly with acidic catalysts such as hydrogen chloride, boron fluoride, ethyl ether and stannic chloride, the polymerization is much more rapid if the lactone is heated in the presence of catalysts. Polymerization is also more rapid in the absence of a solvent. The amount of the catalyst should be only very small in proportion to the amount of lactone treated, generally less than 1% by weight being sufficient.

After the polymerization reaction is initiated by heating the lactone to a temperature ranging from about 50° C. to 150° C. in the presence of a catalyst, the reaction then becomes exothermic and it is often necessary to provide cooling in order to keep the reaction under control. The length of time necessary to form a polymeric material from the lactone varies with the individual compound used from only a few minutes when beta-propiolactone is heated to 100° C. in the presence of a catalyst to several hours when higher molecular weight lactones are used. Completion of the polymerization is shown by the change in character of the material treated and by cessation of heat evolution.

The polymeric material obtained by polymerization of beta-lactones of the type disclosed hereinabove varies in nature from a thick viscous semi-solid mass to a resinous solid material. These polymers are believed to be linear polymeric esters of a molecular weight varying from about 500 to 2,000 or more and having a structure which may be represented as follows:

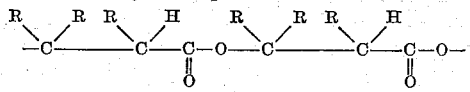

Pyrolysis of beta-lactone polymers in the presence of triaryl phosphates may be accomplished in any desired manner. For example, one preferred method consists simply in adding the beta-lactone polymer to a hot bath of the triaryl phosphate whereupon alpha-beta unsaturated carboxylic acid forms and is removed as it forms by concurrent distillation. Preferably the pyrolysis is carried out at temperatures of from about 130° C. to 300° C. or higher and especially at a temperature of from 200° C. to 250° C. It is also desirable that the pyrolysis be carried out at reduced pressures, for example, at from about 2 mm. to 40 mm., although higher or lower pressures are also operative. The alpha-beta unsaturated carboxylic acid which is recovered in the receiver is anhydrous and of a high degree of purity.

The following examples are intended to illustrate the practice of the invention, but are not to be construed as a limitation upon the scope thereof, for there are, of course, numerous possible variations and modifications. In the examples all parts are by weight.

Example I 416 parts of beta-propiolactone polymer are prepared by heating beta-propiolactone at 100° C. in the presence of a potassium carbonate catalyst.

The crude polymer thus prepared is slowly added to 198 parts of tricresyl phosphate (boiling point 263° C. to 265° C. at 20 mm.) maintained at a temperature in the range of 190° C. to 200° C. and at a pressure of 12 mm. Hg. and contained in a vessel equipped with a condenser and condensate receiver. The addition of the beta-propiolactone polymer is continued over a period of 70 minutes and there is collected in the receiver a 91% yield of anhydrous acrylic acid, based on the quantity of crude beta-propiolactone polymer charged.

Example II 354 parts of beta-propiolactone polymer (prepared as in Example I) are added, as in Example I, to 198 parts of tricresyl phosphate maintained at a temperature of from 248° C. to 252° C. and at a pressure of 20 mm. Hg. An 88% yield of acrylic acid is collected in the attached receiver.

Example III

Example II is repeated except that the tricresyl phosphate is maintained at a temperature of 145° C. to 150° C. and at a pressure of 2.5 mm. Hg. A 78% yield of anhydrous acrylic acid is obtained.

Moreover, by a similar procedure alpha-methyl acrylic acid is obtained from alpha-methyl-beta-propiolactone polymer, and beta-beta-dimethyl acrylic acid is obtained from the polymer of beta-methyl-beta-butyrolactone, to mention but a few of the alpha-beta unsaturated carboxylic acids which can be obtained in pure anhydrous form from beta-lactone polymers according to the method of the present invention.

Although the invention has been described in relation to preferred embodiments, numerous modifications will be apparent to those skilled in the art. Accordingly, it is not intended that the invention be limited except by the spirit and scope of the appended claims.

I claim:

1. In a method for preparing an alpha-beta unsaturated monocarboxylic acid by pyrolyzing a polymer of a beta-lactone of a monocarboxylic acid having at least one unsubstituted hydrogen atom on its alpha carbon atom and containing only unreactive hydrocarbon substituents, the improvement which comprises carrying out the pyrolysis in the presence of a triaryl phosphate.

2. In a method for preparing an alpha-beta unsaturated monocarboxylic acid by pyrolyzing a polymer of a beta-lactone of a monocarboxylic acid having at least one unsubstituted hydrogen atom on its alpha carbon atom and containing only unreactive hydrocarbon substituents, the improvement which comprises carrying out the pyrolysis in the presence of tricresyl phosphate maintained at a temperature of from 130° C. to 300° C.

3. In a method for preparing an alpha-beta unsaturated monocarboxylic acid by pyrolyzing a polymer of a beta-lactone of a monocarboxylic acid having at least one unsubstituted hydrogen atom on its alpha carbon atom and containing only unreactive hydrocarbon substituents, the improvement which comprises adding said beta-lactone polymer to tricresyl phosphate maintained at a temperature of from 130° C. to 300° C. and at a reduced pressure.

4. In a method for preparing an alpha-beta unsaturated monocarboxylic acid by pyrolyzing a polymer of a beta-lactone of a monocarboxylic acid having at least one unsubstituted hydrogen atom on its alpha carbon atom and containing only unreactive hydrocarbon substituents, the improvement which comprises adding said beta-lactone polymer to tricresyl phosphate maintained at a temperature of from 130° C. to 300° C. and at a pressure of from 2 mm. to 40 mm. Hg.

5. In a method for preparing acrylic acid by pyrolyzing a polymer of beta-propiolactone, the improvement which comprises carrying out the pyrolysis in the presence of tricresyl phosphate.

6. In a method for preparing acrylic acid by pyrolyzing a polymer of beta-propiolactone, the improvement which comprises carrying out the pyrolysis in the presence of tricresyl phosphate maintained at a temperature of from 130° C. to 300° C. and at a reduced pressure.

7. The method of claim 6 wherein the pyrolysis temperature is from 200° C. to 250° C. and the pressure is from 2.0 mm. to 40 mm. Hg.

ARCHIE B. JAPS.

REFERENCES CITED

The following references are of record in the file of this patent:

UNITED STATES PATENTS

| Number | Name | Date |
| --- | --- | --- |
| 2,361,036 | Kung | Oct. 24, 1944 |
| 2,469,701 | Redmon | May 10, 1949 |
| 2,484,067 | Boese | Oct. 11, 1949 |